No. 692,683. Patented Feb. 4, 1902.
T. J. LITLE, Jr.
APPARATUS FOR SUPPLYING AIR OR OTHER COMBUSTION SUPPORTING SUBSTANCE TO GAS OR OTHER BURNERS.
(Application filed Aug. 6, 1900.)
(No Model.) 3 Sheets—Sheet 1.
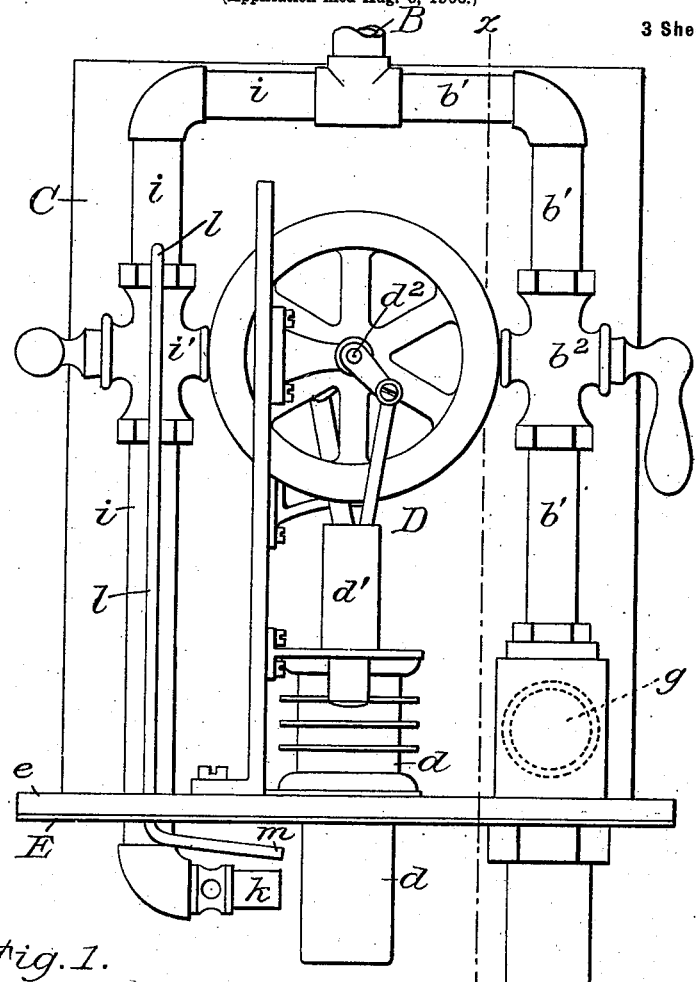
Fig. 1.
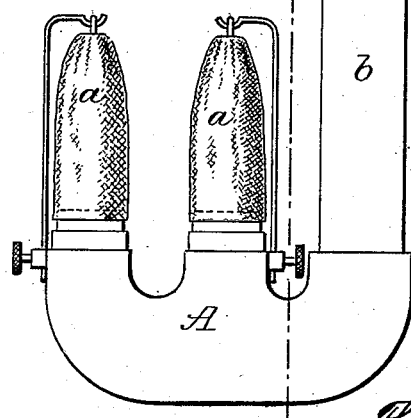
Attest:
T. W. Fowler
C. W. Fowler
Inventor:
Thomas J. Litle, Jr.
By Howell Battle
Attorney No. 692,683. Patented Feb. 4, 1902.
T. J. LITLE, Jr.
APPARATUS FOR SUPPLYING AIR OR OTHER COMBUSTION SUPPORTING SUBSTANCE TO GAS OR OTHER BURNERS.
(Application filed Aug. 6, 1900.)
(No Model.) 3 Sheets—Sheet 2.
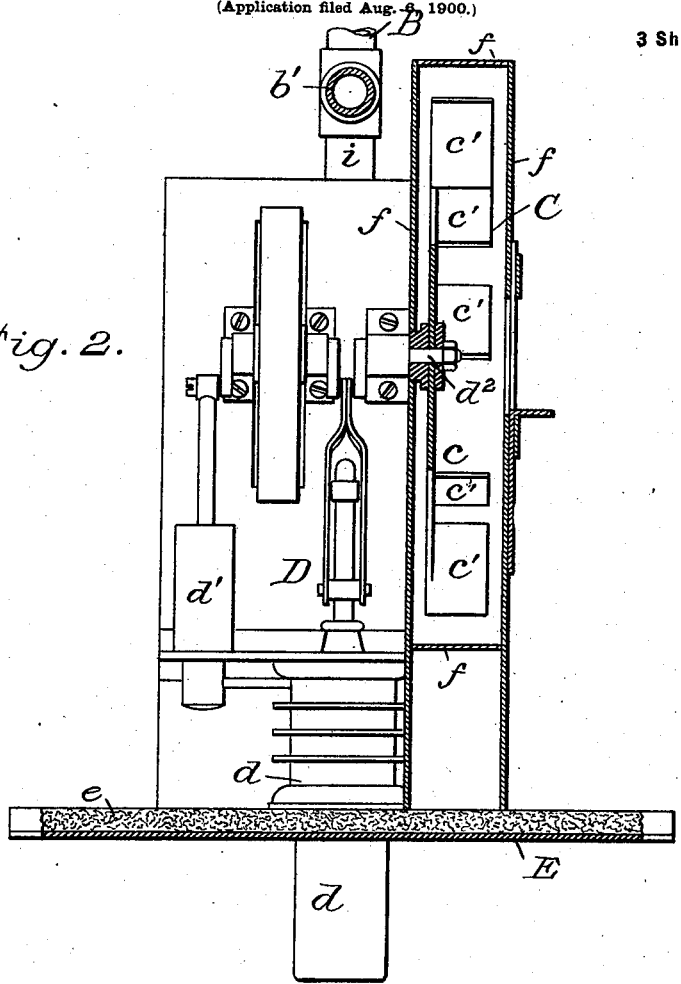
Fig. 2.
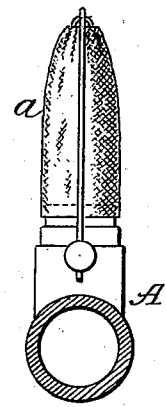
Attest:
T. N. Fowler
C. N. Fowler
Inventor:
Thomas J. Litle, Jr.,
By Lowell Battle
Attorney
THE NORRIS PETERS CO., PHOTO-LITHO., WASHINGTON, D. C.

No. 692,683. Patented Feb. 4, 1902.
T. J. LITLE, Jr.
APPARATUS FOR SUPPLYING AIR OR OTHER COMBUSTION SUPPORTING SUBSTANCE TO GAS OR OTHER BURNERS.
(Application filed Aug. 6, 1900.)
(No Model.) 3 Sheets—Sheet 3.
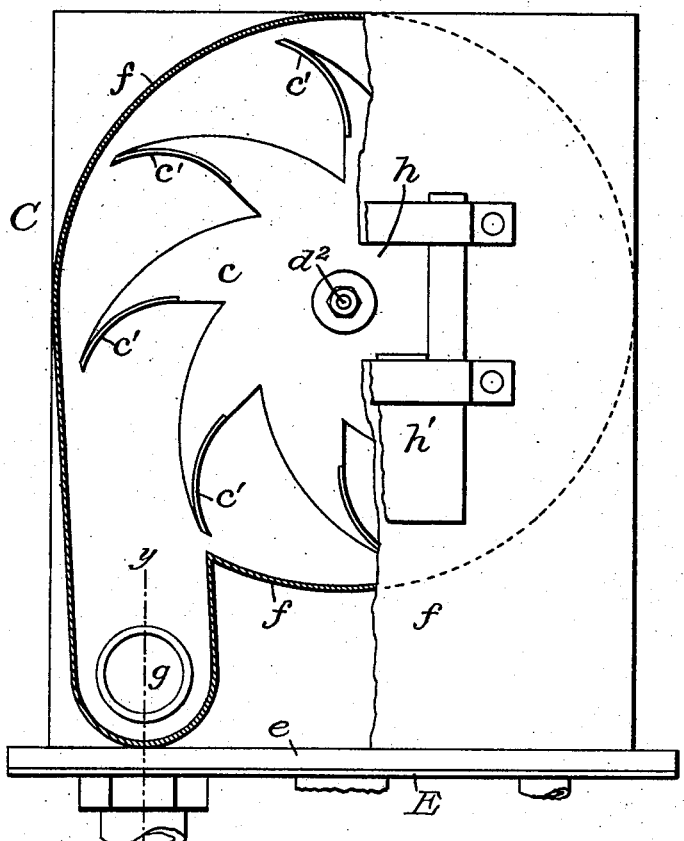
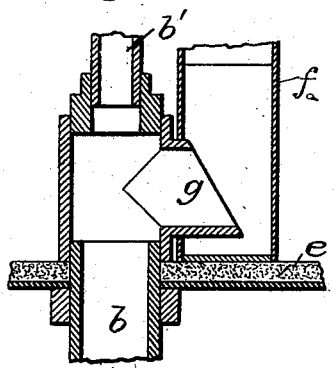
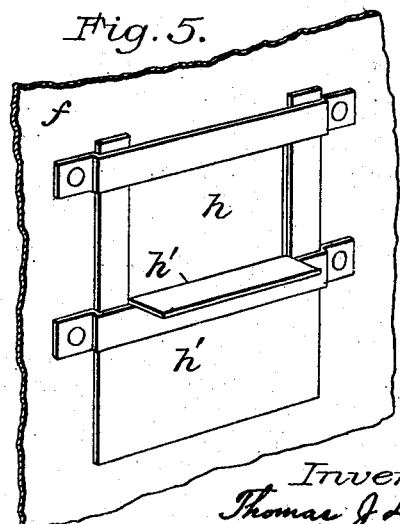
Attest:
P. W. Fowler
C. W. Fowler
Inventor:
Thomas J. Litle, Jr.,
By Lowell Bartlett
Attorney

UNITED STATES PATENT OFFICE.

THOMAS J. LITLE, JR., OF CLEVELAND, OHIO, ASSIGNOR TO THE NEW PROCESS LIGHTING COMPANY, OF CLEVELAND, OHIO, A CORPORATION OF OHIO.

APPARATUS FOR SUPPLYING AIR OR OTHER COMBUSTION-SUPPORTING SUBSTANCE TO GAS OR OTHER BURNERS.

SPECIFICATION forming part of Letters Patent No. 692,683, dated February 4, 1902.

Application filed August 6, 1900. Serial No. 26,039. (No model.)

*To all whom it may concern:*

Be it known that I, THOMAS J. LITLE, Jr., a citizen of the United States, residing at Cleveland, in the county of Cuyahoga and State of Ohio, formerly a resident of Philadelphia, in the county of Philadelphia and State of Pennsylvania, have invented new and useful Improvements in Lamps, of which the following is a specification.

The object of this invention is to provide a self-contained lamp having a heating-burner associated with an incandescible material, with means operated by the heat of the burner for increasing the incandescence.

To this end the invention consists of a lamp having a burner so operating, a caloric-engine driven by the heat of the burner, and means operated by the caloric-engine for augmenting the supply of combustion-supporter to the burner. The combustion-supporter is most commonly the atmospheric air, though the term includes artificial oxygen or any similarly acting gas as well.

That air under moderate pressure supplied to a gas or vapor burner will increase the heat or light giving power to an intensity far exceeding that to be attained by air supplied under little or no pressure is well known, and heretofore it has been attempted to supply pressure to the air by means of mechanism operated by the current of air set in motion by the heat of the burner. Such current, however, while it may slightly augment the air-supply, is incapable of giving to it pressure which can approximate the desired amount. The apparatus I have devised employs a "caloric-engine," which term I use herein in contradistinction to mechanism operated by the current of air induced by the burner. I have found by experiment that this engine is amply sufficient to meet the requirements.

In embodying the lamp I provide incandescible material, preferably in the form of one or more Welsbach mantles, a heating burner or burners therefor, and a supply-pipe leading thereto, and I establish the engine above the burner, so that it may be operated by the waste heat therefrom, and the power of the engine is used to increase the supply of combustion-supporter to the burner, the result of which is that the illumination caused by the burner is greatly augmented.

I have found it very efficient to provide a rotary blower driven by the engine and discharging air into a pipe leading gas to the burner. Such a construction is that shown in the drawings herein and will now be described in detail.

In my copending case, Serial No. 45,986, filed February 4, 1901, as a renewal of application Serial No. 3,434, filed January 31, 1900, a lamp is shown wherein gas is pumped by a caloric-engine into a reservoir and escapes therefrom in a jet, taking air with it to the burner. The present application includes such construction generically, but, as shown, is specifically differentiated therefrom by employing mechanical means—as a blower, for example—to force the air to the burner.

Referring to the drawings, Figure 1 is a front elevation of an apparatus embodying my invention. Fig. 2 is a transverse vertical section of the same, taken on line $x$ $x$ of Fig. 1. Fig. 3 is a rear elevation of the air-supplying device, the outer casing thereof being broken away to disclose the blower and the outlet leading to the gas-burner. Fig. 4 is a sectional view taken on line $y$ $y$ of Fig. 3, illustrating in detail the connection between the blower-chamber and the fuel-supply pipe; and Fig. 5 is a perspective view of the slide or damper for regulating the admission of air to the blower-chamber.

In the drawings I show a double burner A, supplied with two incandescing mantles $a$ $a$; but it is obvious that a single burner or several may be employed. This burner A is connected by pipes $b$ and $b'$ with a gas or fuel supply pipe B, the supply of fuel being regulated by a valve or stop-cock $b^2$ in pipe $b'$, as clearly illustrated in Fig. 1.

The air-supplying mechanism or device C and its motor D may be variously located with reference to each other and to the burner A so long as the motor is in a position to be driven by the heat from the burner. As shown, both the motor and the air-supplying device are supported upon a platform E, secured to the pipe $b$, and this platform also serves as a diaphragm for insulating the main portion of the apparatus from the heat and the products of combustion of the burner.

The motor D is shown as illustrative of a well-known type of caloric-engine operating by expansion and contraction of air, thus converting the heat into mechanical energy, which I use to increase the air-supply to the burner. This motor includes the expansion and contraction or displacement cylinder $d$, arranged in an upright position, with its lower end projecting through and slightly below the platform or diaphragm E in position to receive the heat from the burner A, the upper portion of the cylinder, as well as the main portion of the motor and the air-supplying device, being insulated from the heat and the products of combustion by this diaphragm E, which is shown as covered with a layer of asbestos $e$. Associated with this displacement-cylinder $d$ is the driving-cylinder $d'$, the lower end of which is in communication with the upper end of the displacement-cylinder. In the displacement-cylinder there may be the usual loose displacer connected by a rod with a crank on the shaft $d^2$ and in the driving-cylinder a snugly-fitting piston connected by a rod with a crank on this same shaft $d^2$.

As is well understood, the air in the displacement-cylinder becoming heated and expanding creates a pressure therein, which, acting around the loose displacer, will force upward the piston in the driving-cylinder. This will bring down the displacer, which will bodily transfer the air from the lower end of the cylinder $d$ to its upper end and into the cylinder $d'$, where it will contract from the coolness of this upper end and of the cylinder $d'$, allowing the piston in the latter to descend. Thus a caloric-engine is provided which gives continuous rotation to the shaft $d^2$.

The shaft $d^2$ operates the air-supplying device, which is shown as a rotary blower C, having a series of blades or fans $c'$, mounted on the end of the shaft $d^2$, to rotate within the chamber formed by the case $f$. The blower-chamber is connected to the burner A by way of the pipe $b$, said chamber having an outlet at $g$, near the platform E, which enters the pipe $b$, as shown in Figs. 3 and 4. In the rear wall of the casing $f$ is an air-inlet $h$, the area of which is regulated by a slide or damper $h'$ for controlling the air to the blower and to the burner.

From the gas-supply pipe B a branch pipe $i$ leads to a burner $k$, located beneath the platform E and adjacent to the lower end of the cylinder $d$, the fuel to said burner being shown as controlled by a valve or stop-cock $i'$. At a point above said stop-cock connection is made with pipe $i$, by means of a small tube $l$, for supplying fuel to a pilot-burner $m$, located in position to ignite the fuel from the burner $k$.

The pilot-frame is intended to burn continuously to provide for ignition of the other burners; but it is also of service in contributing its heat to the engine, in cold weather, especially, keeping the chill thereoff and hastening the starting. To start the apparatus, the cock $i'$ is opened for supplying fuel to the burner $k$, which is immediately ignited by the flame from the pilot-burner $m$. The heat generated by the burner $k$ quickly heats the cylinder $d$ sufficiently to cause the motor to operate, after which the cock $i'$ is closed and the cock $b^2$ opened for the supply of fuel to the burner A, which is also ignited by the pilot-flame. The motor D will now be operated by the waste heat from the burner A, which will be intensified by the air or oxygen supplied to the burner by the blower C, the latter being operated by the motor to supply the air under the desired pressure. It will thus be seen that the apparatus is automatic in its operation, waste heat from the burner being converted into the power supplying the air, and that the latter will be supplied in a continuous current and with sufficient force or pressure to meet all requirements for a brilliant light.

Having described my invention, I claim—

1. In a lamp, in combination, an incandescible material and a heating-burner therefor, a caloric-engine operated by the heat of said burner, a conduit leading to said burner, and means actuated by said caloric-engine for augmenting the supply of combustion-supporter to said burner through said conduit.

2. In a lamp, in combination, an incandescible material and a heating-burner therefor, a caloric-engine operated by the heat of the burner, a conduit for supplying combustible fluid to said burner, and means operated by said engine for augmenting the supply of combustion-supporter to said burner through the same conduit.

3. In a lamp, in combination, an incandescible material and a heating-burner therefor, a caloric-engine operated by the heat thereof, a blower driven by said engine, a discharge-passage from said blower and a gas-supply pipe both communicating with said burner.

4. In a lamp, in combination, an incandescible material and a heating-burner therefor, a passage-way for leading gas and air thereto, a caloric-engine operated by the heat of the burner, a fan of a rotary blower driven by said engine, a casing for said rotary blower inclosing the fan and communicating with said passage-way.

5. In a lamp, in combination, an incandescible material, and a heating-burner therefor, a caloric-engine operated by the heat thereof, a blower driven by said engine and suitably connected for forcing a continuous current of air to said burner, and means for regulating the admission of air to said blower.

6. In a lamp, the combination of an incandescible material, a heating-burner adapted to coöperate therewith, a caloric-engine operated by the waste heat from said burner, and means operated by such caloric-engine for increasing the supply of combustion-supporter for such burner.

7. In a lamp, in combination, an incandescible material, a burner adapted to heat the same, a supply-pipe leading to said burner, an air-passage to said pipe, a caloric-engine above said material operated by the waste heat from said burner, and means actuated by said caloric-engine for augmenting the air-supply through said pipe.

8. In a lamp, the combination of an incandescible material and a heating-burner therefor, a caloric-engine operated by the heat thereof, means operated by said engine for augmenting the supply of combustion-supporter to the burner, and an independent heater for initially heating the caloric-engine.

9. In a lamp, the combination of incandescible material and a heating-burner therefor, a caloric-engine operated by the heat thereof, means operated by said engine for augmenting the supply of combustion-supporter to said burner, a Bunsen burner for initially heating the caloric-engine, and independent supply-pipes for said two burners branching from a common supply-pipe.

10. In a lamp, the combination of incandescible material and a main heating-burner therefor, a caloric-engine operated by the heat thereof, means operated by said engine for augmenting the supply of combustion-supporter to said burner, an independent heating-burner for initially heating the caloric-engine, and a pilot-burner common to both the main heating-burner and the independent heating-burner.

11. In a lamp, the combination of incandescible material and a heating-burner therefor, a caloric-engine operated by the heat thereof, means operated by said engine for augmenting the supply of combustion-supporter to said burner, an ignition or pilot burner adapted to continuously carry light, said pilot-burner being located in position to contribute its heat to the engine.

12. In a lamp, the combination of incandescible material and a heating-burner therefor, a caloric-engine supported above the burner, a heat-diaphragm between the burner and engine, a supply-pipe to the burner, and means operated by the caloric-engine for forcing air through said supply-pipe to the burner.

13. In a lamp, in combination, a suspensible frame including a depending gas-pipe, an incandescible material and a heating-burner therefor in communication with said gas-pipe, a caloric-engine supported by said frame above said burner, and means operated by the engine for increasing the supply of combustion-supporter to said burner.

14. In a lamp, in combination, a suspensible frame including a depending gas-pipe, an incandescible material and a heating-burner therefor carried by and in communication with said gas-pipe, a caloric-engine carried by said frame above the burner, a heat-diaphragm between the burner and engine, and means operated by the engine for augmenting the supply of combustion-supporter to said burner.

15. In a lamp, in combination, a suspensible frame including a depending gas-pipe, a burner having an incandescing-mantle and carried by and in communication with the lower end of said gas-pipe, a caloric-engine carried by said frame above said burner, a blower-fan driven by said engine, a blower-casing for said fan communicating with said gas-pipe, whereby the engine operates to force air into said gas-pipe, and means for regulating the admission of air to said blower-casing.

16. In a lamp, a suspensible frame including a depending gas-pipe, a burner carried by and in communication with the lower end of said gas-pipe, an incandescible material associated with the burner, a caloric-engine carried by said frame above said burner, a fan driven by said engine, a casing for said fan communicating with said gas-pipe, whereby the engine operates to force air into said gas-pipe, and a heat-diaphragm above the burner and crosswise of the displacement-cylinder of the caloric-engine.

17. In a lamp, the combination of an incandescible material and a heating-burner therefor, a caloric-engine which converts a portion of the waste heat from said burner into rotary mechanical movement, and mechanism operated by such rotary movement for increasing the supply of combustion-supporter to the burner.

In testimony whereof I have hereunto set my hand in presence of two subscribing witnesses.

THOS. J. LITLE, JR.

Witnesses:
C. A. NEALE,
HOWELL BARTLE.